B. F. C. GUELDENHAAR.
SEEDER.
APPLICATION FILED JULY 11, 1919.
1,345,362. Patented July 6, 1920.
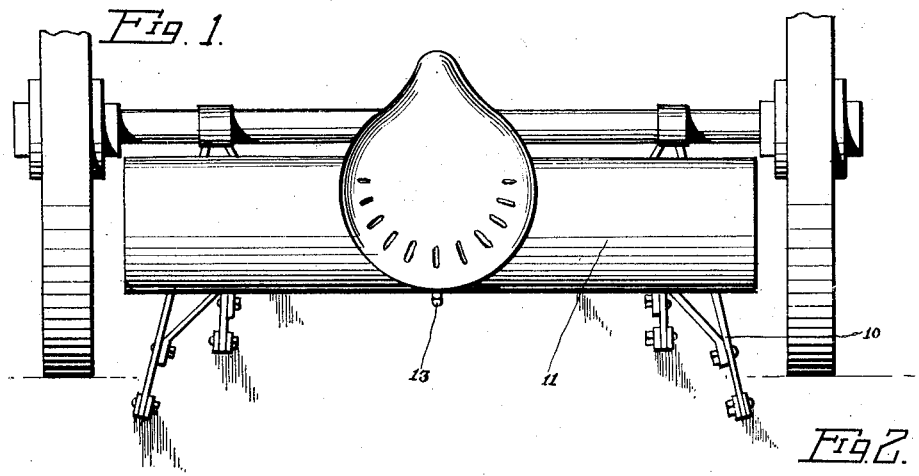
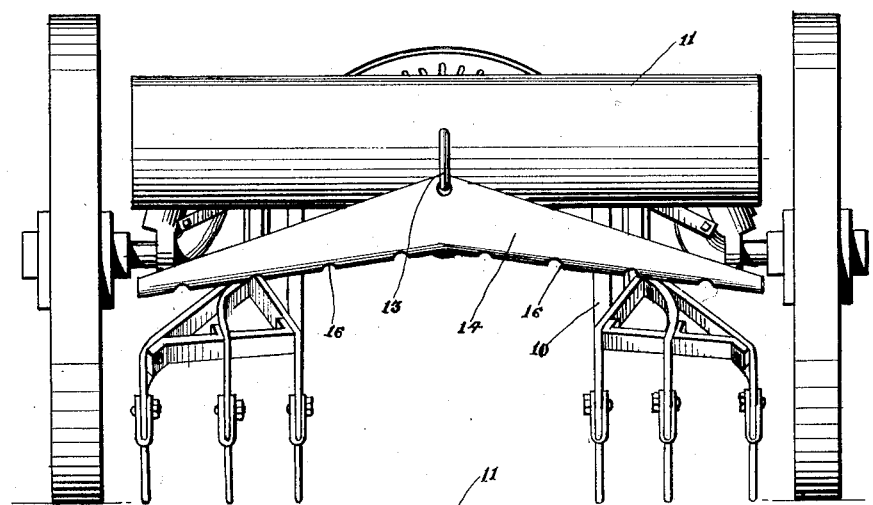
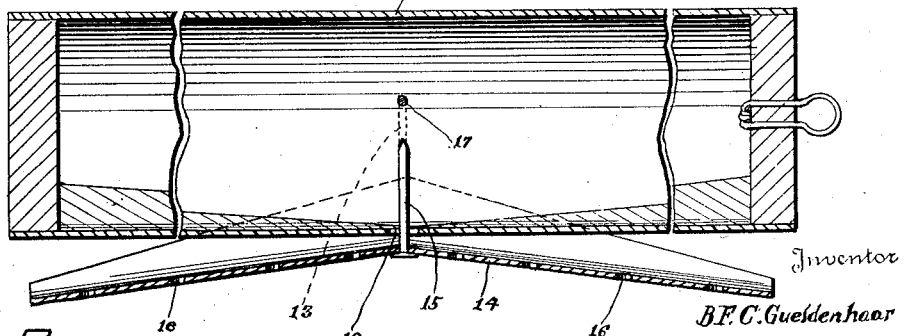
Inventor
B. F. C. Gueldenhaar

UNITED STATES PATENT OFFICE.

BERNHARD F. C. GUELDENHAAR, OF FLANAGAN, ILLINOIS.

SEEDER.

1,345,362. Specification of Letters Patent. Patented July 6, 1920.

Application filed July 11, 1919. Serial No. 310,152.

*To all whom it may concern:*

Be it known that I, BERNHARD F. C. GUELDENHAAR, a citizen of the United States, residing at Flanagan, in the county of Livingston, State of Illinois, have invented certain new and useful Improvements in Seeders; and I do hereby declare the following to be a full, clear, and exact description of the invention, such as will enable others skilled in the art to which it appertains to make and use the same.

This invention relates to new and useful improvements in seeding devices and particularly to devices for sowing rape seed or the like in corn fields.

One object of the present invention is to provide a novel and improved device of this character by means of which the rape or other like seeds can be sowed while the cultivation of the corn is being accomplished.

Another object is to provide a novel and improved device of this character which is adapted to be attached to a cultivator and which operates automatically by the swaying and jarring of the cultivator.

A further object is to provide a novel and improved device of this character wherein the seeds within the container are agitated by the means which delivers the seeds to the ground.

Other objects and advantages will be apparent from the following description when taken in connection with the accompanying drawing.

In the drawing:

Figure 1 is a top plan view of a portion of a cultivator showing the invention applied thereto.

Fig. 2 is a rear elevation of the cultivator showing the arrangement of the device and the position of the distributer.

Fig. 3 is an enlarged vertical longitudinal sectional view through the seed container and distributer.

Referring particularly to the accompanying drawing, 10 represents the frame of the cultivator, on which is mounted the transversely extending approximately cylindrical seed container 11. The bottom of this container inclines downwardly from each end, toward the center, where there is formed an outlet opening 12 for the seeds. Secured to the front and rear of the central portion of the seed container are the downwardly extending arms 13, and disposed longitudinally beneath the seed container, is a chute 14 which inclines downwardly from the center toward both ends. Rigidly carried by the center of this chute and extending upwardly through the opening 12 of the container, is an agitator stem 15, which stirs up the seeds within the container and causes them to flow freely through said opening onto the chute. On the bottom of each inclined portion of the chute there are formed the longitudinal series of openings 16 through which some of the seeds fall to the ground. A transverse pivot pin 17 is disposed through the central portion of the chute, and through the lower ends of the arms 13, whereby the chute is pivotally suspended beneath the container, and is permitted to rock when the cultivator is in operation, whereby seeds will be caused to be discharged from the container into the chute and through the said openings thereof and from the outer ends of the chute. As the cultivator proceeds the swaying and jarring of its movements will cause the chute to swing on its pivot, with the result that the seeds in the container will be caused to drop into the chute and be distributed onto the ground transversely of the cultivator. Thus the seeding device does not require attention on the part of the driver of the cultivator, as the action of feeding and distributing the seeds is entirely automatic.

What is claimed is:

1. A seeding attachment for a cultivator comprising a seed container having a seed discharge opening in the center of the bottom thereof, and a double-incline chute mounted below said opening for receiving seed from the container and arranged for automatic rocking movement to discharge said seeds from both ends thereof to the ground.

2. A seeding attachment for a vehicle comprising a seed container having a discharge opening in the bottom, a rocking chute mounted below said opening and arranged to be oscillated by the swaying movements of the vehicle, and an agitator carried by the chute and extending into and movable within said opening.

3. A seeding attachment for a vehicle comprising a seed container having a discharge opening in the bottom thereof, a chute suspended on the container below the said opening and inclining downwardly toward its ends, said chute having discharge openings along its length, and a vertical stem carried by the center of the chute extending upwardly into said opening to agitate the seeds within the container.

In testimony whereof I affix my signature in the presence of two witnesses.

BERNHARD F. C. GUELDENHAAR

Witnesses:
WALTER A. WILCOX,
DAVID LONDON.